May 17, 1938.                O. J. HOLMES                2,117,806
MECHANISM FOR CAUSING INTERMITTENT FILM MOVEMENT
Filed Feb. 25, 1937            6 Sheets-Sheet 4
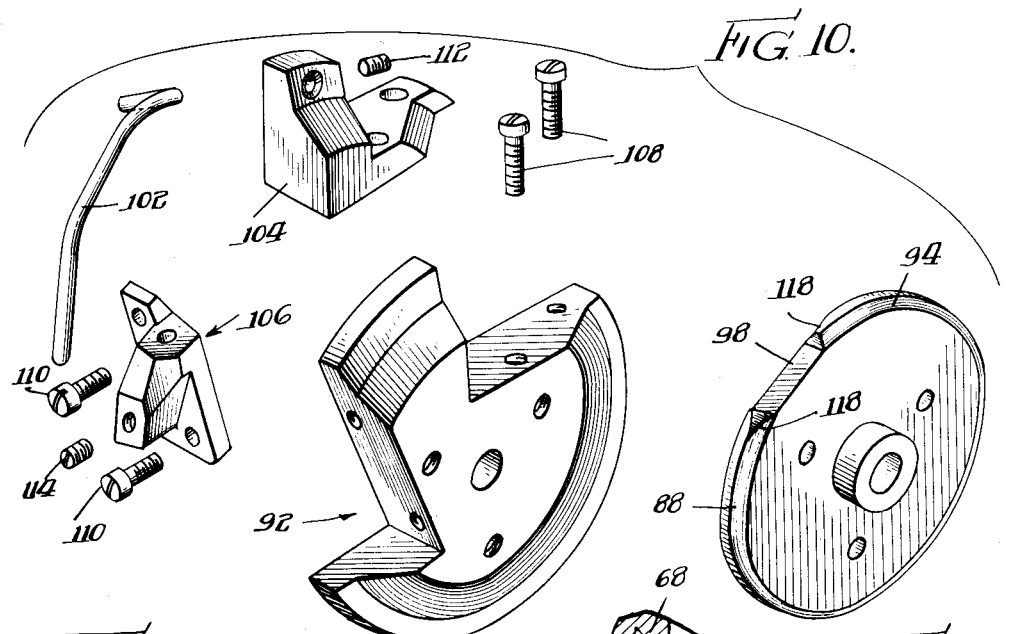
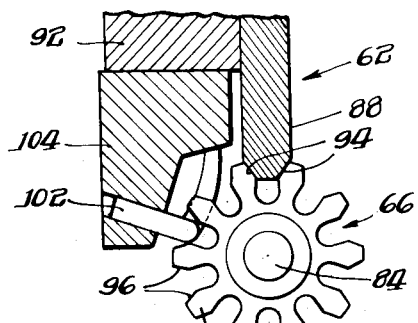
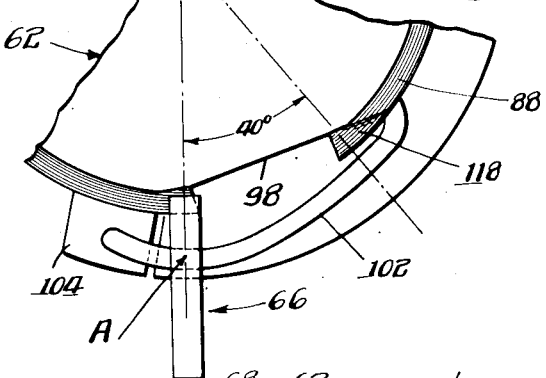
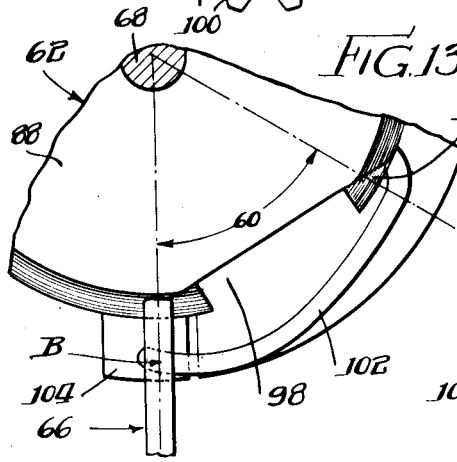
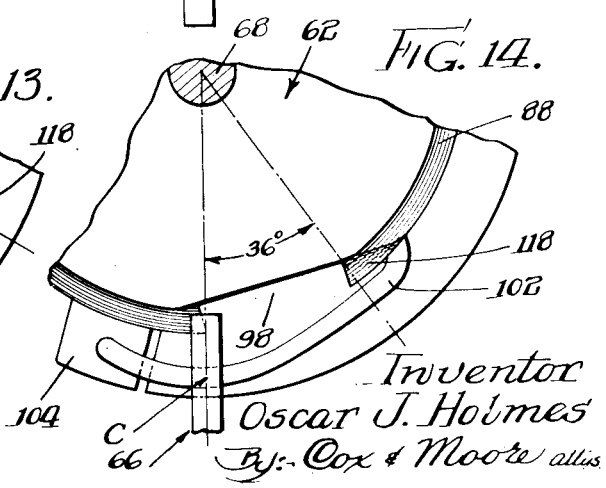
Inventor
Oscar J. Holmes
By:- Cox & Moore attys May 17, 1938.　　　O. J. HOLMES　　　2,117,806
MECHANISM FOR CAUSING INTERMITTENT FILM MOVEMENT
Filed Feb. 25, 1937　　　6 Sheets-Sheet 5
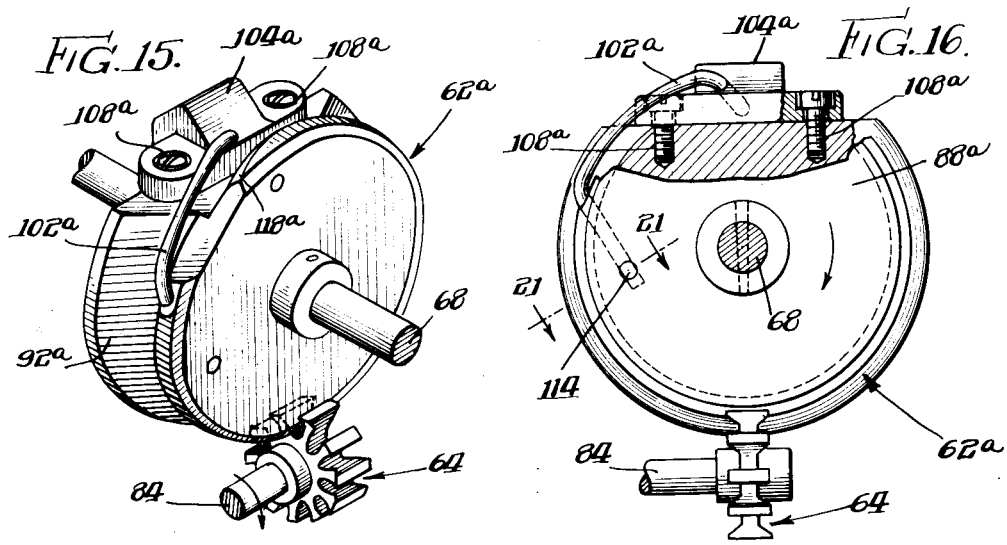
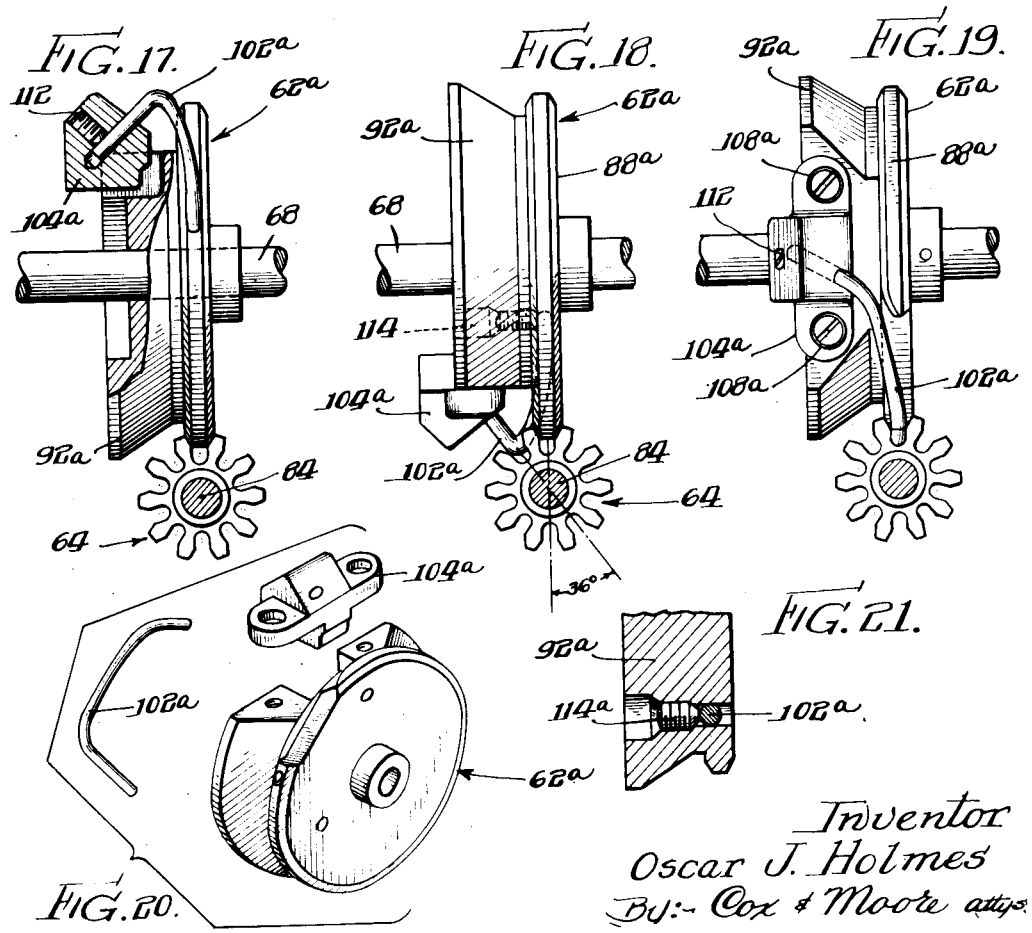
Inventor
Oscar J. Holmes
By:- Cox & Moore attys May 17, 1938.    O. J. HOLMES    2,117,806
MECHANISM FOR CAUSING INTERMITTENT FILM MOVEMENT
Filed Feb. 25, 1937    6 Sheets-Sheet 6
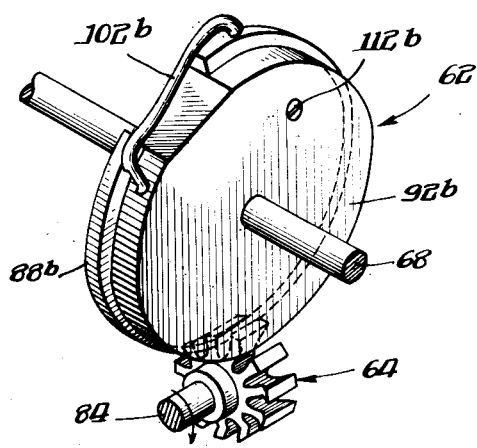
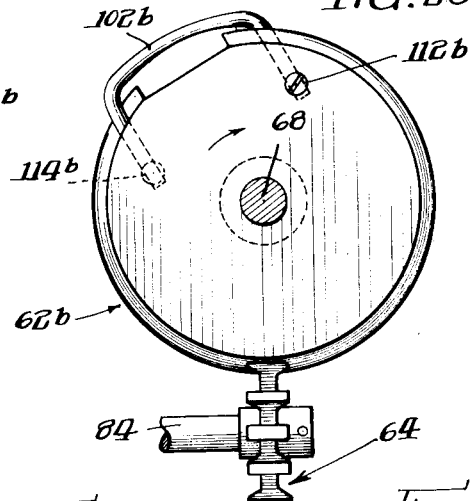
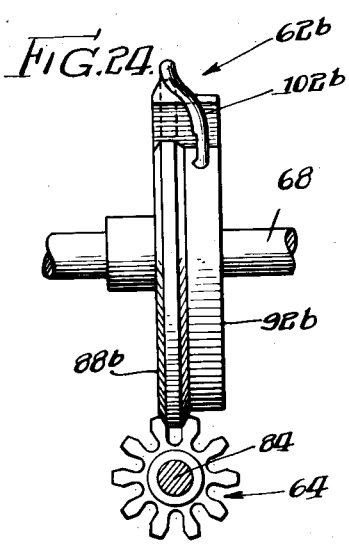
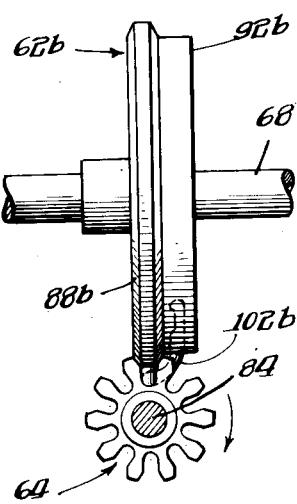
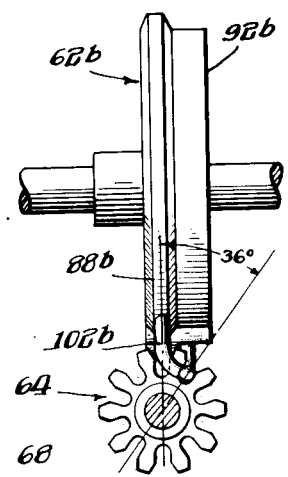
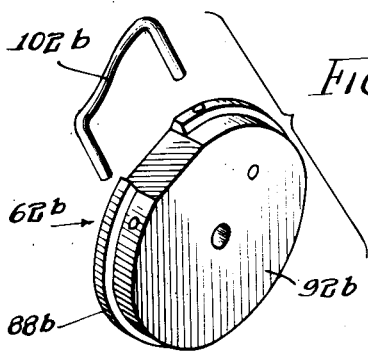
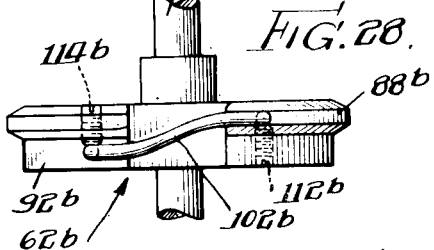
Inventor
Oscar J. Holmes
By:- Cox & Moore attys.

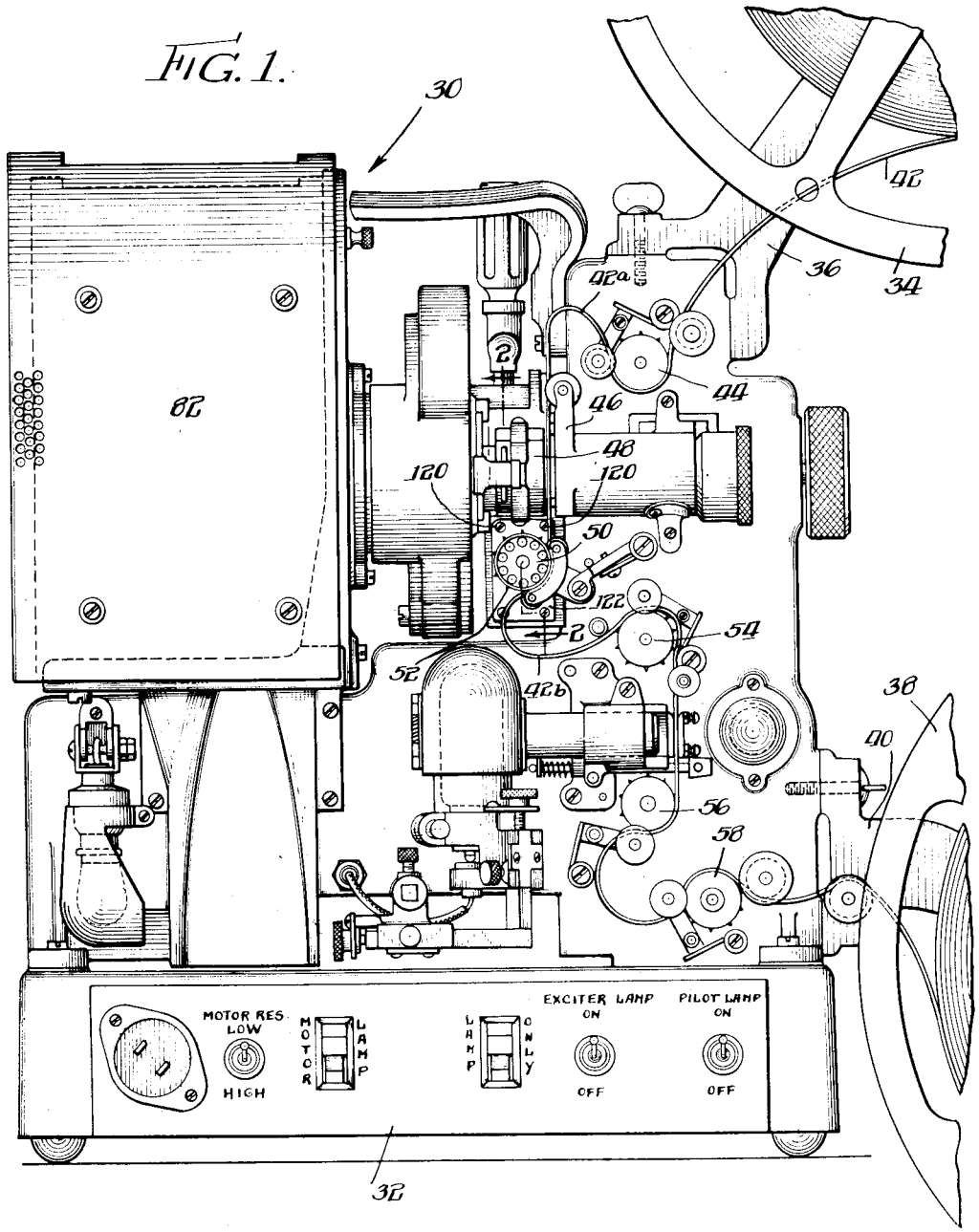

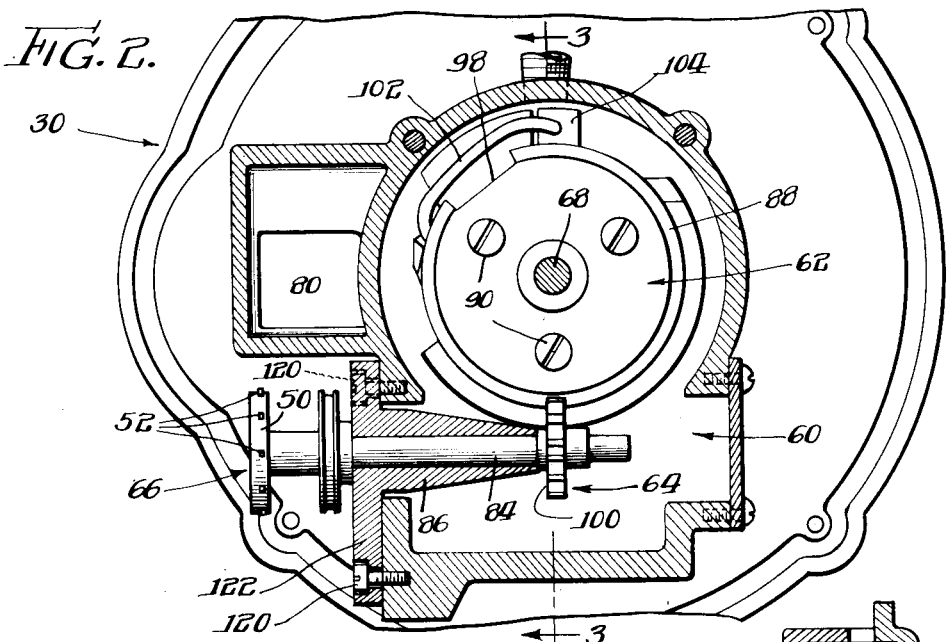
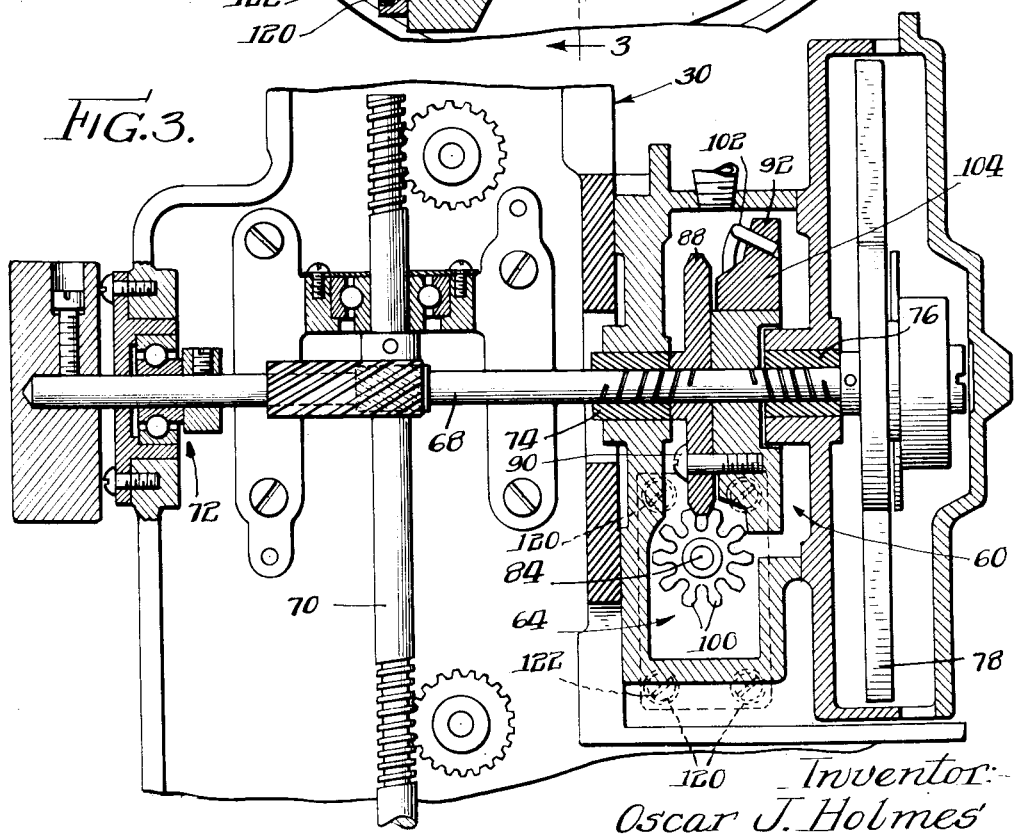

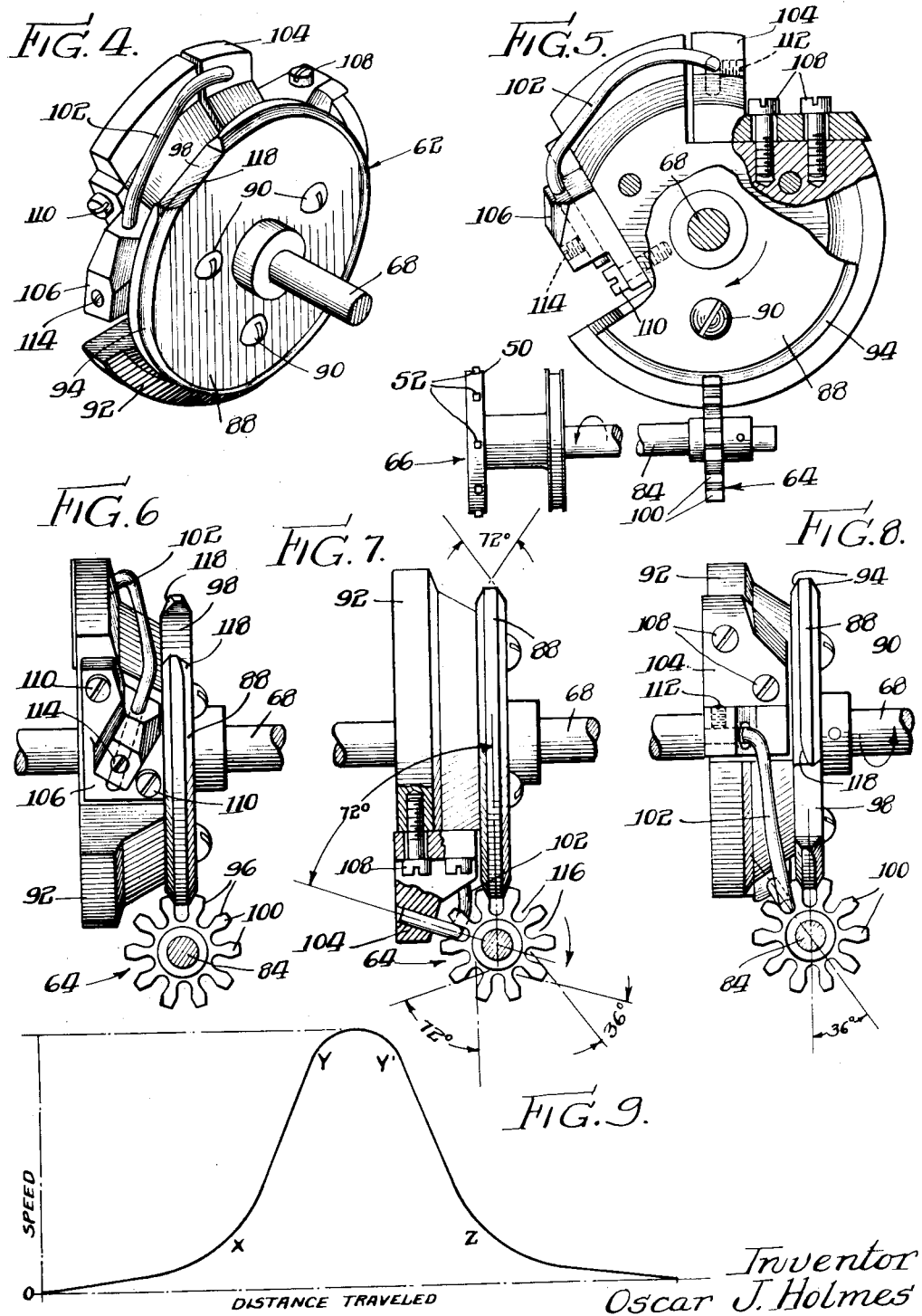

Patented May 17, 1938

2,117,806

UNITED STATES PATENT OFFICE 2,117,806

MECHANISM FOR CAUSING INTERMITTENT FILM MOVEMENT

Oscar J. Holmes, Chicago, Ill.

Application February 25, 1937, Serial No. 127,709

25 Claims. (Cl. 74—436)

This invention relates generally to mechanism for causing intermittent movement, and more particularly to intermittent movement mechanism for motion picture apparatus such as motion picture projectors, cameras, printers, and other motion picture apparatus that requires intermittent film movement.

Conventional present day equipment for intermittently moving motion picture film presents certain serious disadvantages and inconveniences which the present invention contemplates obviating. One of the most serious problems with which users of conventional motion picture apparatus are confronted is that of preserving film life. Conventional Geneva and claw mechanisms heretofore and at present employed to impart intermittent movement to film subject the film to relatively severe operating conditions. That is to say, these mechanisms, because of their inherent functional deficiencies, materially contribute to the reduction in useful life of the film. It is, therefore, one of the important objects of the present invention to provide an intermittent movement mechanism which will cause motion picture film to experience intermittent movement with a minimum amount of wear and tear, whereby to materially increase the useful life thereof.

The speed of intermittent movement of motion picture film obviously governs the required duration of shutter period and, therefore, if the speed of this intermittent movement can be increased without increasing the frequency of the intermittent movement increased efficiency in screen illumination will result. It is, therefore, another important object of the present invention to provide an intermittent movement device or mechanism whereby the speed of intermittent movement of a motion-picture film may be materially increased over speeds heretofore possible in conventional motion-picture equipment without increasing the number of frames fed per second past the shutter controlled aperture. More specifically, my invention contemplates the provision of means whereby it is possible to obtain the above mentioned increase in speed without decreasing the life of the film, this being accomplished by a more gradual acceleration and deceleration at the beginning and end of the intermittent film movement, thereby reducing to a minimum the sprocket wear upon the film.

Another and very important object of the present invention is to provide an intermittent mechanism of the type set forth above, which is conveniently adjustable so as to accommodate said mechanism for a relatively wide range of speed ratios, and to this end the invention contemplates a novel, adjustable cam and star mechanism.

More specifically, the invention contemplates a mechanism for imparting intermittent movement to film, as previously set forth, wherein a cam device of extremely simple and durable construction is provided, to-wit, a cam device including a single length of wire capable of imparting intermittent movement to the sprocket shaft at increased speeds with appreciably less wear and tear upon the film.

The foregoing and numerous other objects and advantages will be more apparent when considered in connection with the accompanying drawings, wherein—

Figure 1 is a side elevational view of motion picture apparatus, more particularly, a motion picture projector, which is equipped with my improved novel mechanism for imparting intermittent movement to motion picture film;

Figure 2 is an enlarged vertical sectional view taken substantially along the line 2—2 of Figure 1 to more clearly illustrate the star and cam mechanism in combination with the sprocket;

Figure 3 is a vertical sectional view taken substantially along the line 3—3 of Figure 2;

Figures 4 to 8, inclusive, disclose a preferred embodiment of my improved mechanism for causing intermittent movement; Figure 4 is a perspective view of the cam mechanism wherein both extremities of the cross-over wire are mounted in adjustable supports; Figure 5 is a fragmentary view, somewhat similar to the view disclosed in Figure 2, more clearly illustrating the relative disposition of the sprocket, star, and cam mechanism, a portion of the cam dwell structure being broken away to more clearly disclose parts otherwise hidden; Figure 6 is a view from the left of Figure 5 disclosing the dwell structure of the cam securing the star against movement; Figure 7 discloses the cross-over wire or cam element as it enters the star to initiate an intermittent movement thereof; Figure 8 discloses the mechanism of Figure 7 just as the cam wire is leaving the star after imparting intermittent movement thereto;

Figure 9 is a diagrammatic illustration of a speed curve to more clearly show the operating characteristic of the mechanism;

Figure 10 is an exploded view of the preferred cam mechanism shown in Figures 4 to 8, inclusive;

Figure 11 is an enlarged fragmentary view of the cam and star disclosing the manner in which the cross-over or cam wire enters the star recess at an angle of 72° to impart intermittent movement thereto;

Figure 12 discloses the cross-over or cam wire set to impart a nine to one speed ratio, said view indicating the point at which the wire engages and disengages with respect to the star so as to cause a 40 degree shutter action;

Figure 13 is a view similar to Figure 12, disclosing a six to one ratio and indicating the relative position of the cam wire and star at the initial engagement and final disengagement thereof so as to cause a 60 degree shutter action;

Figure 14 is a view similar to Figures 12 and 13 disclosing a 36 degree shutter action, or, in other words, a ten to one speed ratio;

Figures 15 to 20, inclusive, disclose a modified cam and star arrangement wherein one extremity of the cam wire is mounted within an adjustable support; Figure 15 is a perspective view of the modified cam and star arrangement; Figure 16 is a view taken from the right of Figure 15 with the upper portion of the dwell structure of the cam broken away to more clearly illustrate the manner in which the wire support may be adjusted; Figure 17 discloses the modified cam and star mechanism, as viewed from the left of Figure 16, a portion of the wire support being shown in section to more clearly illustrate the manner in which said wire is adjustably secured therein; Figure 18 is a view similar to Figure 17 disclosing the cam wire as it is about to enter the peripheral recess of the star at an angle of 36 degrees with respect to the vertical, as distinguished from the 72 degree angle shown in Figure 7; Figure 19 is a view similar to Figures 17 and 18, disclosing the cam wire as it is about to leave the peripheral recess of the star after imparting intermittent movement thereto; Figure 20 is an exploded view of the parts comprising the modified cam mechanism shown in Figures 15 to 19, inclusive;

Figure 21 is an enlarged fragmentary sectional view taken substantially along the line 21—21 of Figure 16, disclosing the manner in which the extremity of the wire, which is mounted within the cam body, is adjustably secured in position by a set screw;

Figures 22 to 28, inclusive, disclose another modified star and cam arrangement wherein both extremities of the cam wire are mounted within the cam body; Figure 22 is a perspective view of said modified structure; Figure 23 discloses the cam and star as viewed from the right of Figure 22; Figure 24 discloses the cam and star during the dwell of the star; Figure 25 discloses the initial engagement of the cam wire and star; Figure 26 discloses the cam wire as it is leaving the star; Figure 27 is an exploded view of the parts comprising the cam mechanism; and Figure 28 is a plan view of the cam mechanism to more clearly illustrate the disposition of the cam wire with respect to the other structure of the cam mechanism.

Referring now to the drawings more in detail wherein like numerals have been employed to designate similar parts throughout the various figures, it will be seen that for the purpose of illustrating one practical embodiment of my improved mechanism for imparting intermittent movement to motion picture film, I have disclosed said mechanism in operative association with a motion picture projector designated generally by the numeral 30 (Figure 1). This projector 30 includes a suitable base 32, an upper reel 34 supported upon a bracket 36 and a lower take-up reel 38 supported upon a bracket 40. Film 42 from the reel 34 passes beneath a feed sprocket 44 and then is provided with a suitable loop portion 42a before passing downwardly past an aperture plate 46 and an aperture gate 48 to an intermittent sprocket 50 forming a part of the mechanism for imparting intermittent movement, later to be described. At least four of the sprocket teeth 52 of the sprocket 50 simultaneously register with complementary sprocket apertures in the film 42, the film, which is of the conventional 16 mm. variety, being engaged only along one apertured margin by the sprocket 50. From the sprocket 50 the film 42 is again provided with a suitable loop portion 42b and then passes over a take-up sprocket 54, a sound sprocket 56, and a hold-back sprocket 58. From the hold-back sprocket 58 the film passes to the take-up reel 38.

For a clear understanding of the present invention it is not necessary to enter into a detailed description of the various elements which comprise the projector 30 other than the elements referred to above. This invention relates primarily to mechanism for imparting intermittent movement to the film and that mechanism is not limited in application to a motion picture projector, but is adapted to be used in other motion picture apparatus for handling motion picture film. It will suffice to say that the projector 30 is a 16 mm. sound on film projector wherein the constant speed of the intermittent cam mechanism (about to be described) is 1440 R. P. M. This speed of revolution causes the film to travel at the rate of 24 frames per second, or, in other words, 7.2 inches of film per second. Thus, at a film speed of 24 frames per second, there is one frame or picture of film entering, stopping, and leaving the picture aperture every 24th part of a second. It is, therefore, of the utmost importance to impart intermittent movement to the film as fast as possible so as to reduce the period of shutter action to a minimum. Obviously, unless the mechanism for imparting the intermittent movement at increased speed is properly designed, the film will be subjected to severe operating conditions which will materially reduce the life thereof. By the use of conventional mechanism for imparting intermittent movement to the film, the speed of intermittent movement must be held within certain limits in order to preserve the life of the film. The mechanism, which I am about to describe for imparting intermittent movement to the film, enables a material increase in speed of movement and at the same time preserves and, in fact, increases the life of the film.

This intermittent movement mechanism I have designated generally by the numeral 60 (Figures 2 and 3). This intermittent movement mechanism 60 includes a cam mechanism designated generally by the numeral 62, a star mechanism designated generally by the numeral 64, and a sprocket mechanism designated generally by the numeral 66. The cam mechanism 62 is mounted upon a shaft 68, which is driven at a constant speed of 1440 R. P. M. through a suitable driving mechanism connected with an electric motor (not shown). It will suffice to say that the electric motor, suitably housed in the lower portion of the projector 30, rotates a vertical shaft 70, which is geared to the horizontal cam drive shaft 68. The left extremity of the shaft 68 (Figure 3) is mounted within a suitable anti-friction bearing 72, and the right extremity of the shaft 68 is mounted within spaced bearings 74 and 76. The extreme right extremity of the shaft 68 carries a shutter 78. The shutter closes the aperture 80 (Figure 2) during the intermittent movement of the film 42, and thus prevents the passage of light from a suitable source (not shown) within the lamp housing 82, through the film during that interval of time. This intermittent movement of the film is caused by the cam mechanism 62, acting upon the star 64, which in turn imparts movement to the sprocket 50. The sprocket 50 and star 64 are mounted upon a common shaft 84. This shaft 84 is suitably mounted within a frame or bracket 86, as clearly shown in Figure 2.

Referring now to the cam mechanism 62 shown in Figures 2 to 8, inclusive, it will be seen that it includes a rotary member 88 which I prefer to call a dwell member. This dwell member is secured by means of screws 90 to a rotary cam carrier 92 which rotates with the shaft 68. The dwell member 88 is provided with angularly disposed peripheral surfaces 94 which pass between complementary surfaces 96 on the star mechanism 64. While the peripheral surfaces 94 engage and pass between the star surfaces 96, as clearly shown in Figures 5 and 6, no movement can be imparted to the star and hence this interval is designated as the period or interval of dwell. It is during this interval that the shutter 78 does not close the aperture 80, thus permitting the projection of the subject-matter of the film 42 upon the screen. It will be noted that the periphery of the dwell member 88 is recessed at 98, and this recess provides clearance for the star teeth 100 during the period of intermittent movement about to be described.

The mechanism for causing intermittent movement of the star 64 includes a cross-over wire or cam element 102. This element 102 comprises a single length of wire which is preferably hardened to withstand wear over a long period of operative use. One extremity of the cam wire 102 is mounted within a support 104 and the opposite end within a support 106. The support 104 is adjustably mounted upon the rotary carrier 92 through the agency of screws 108, and the support 106 is similarly mounted by screws 110. Referring to Figures 5 and 7, it will be seen that sufficient clearance is provided between the screws 108–110 and their respective supports to enable adjustment of said supports. A set screw 112 in the support 104 and a set screw 114 in the support 106 serve to permit adjustment of the wire extremities within their companion supports. The necessity of the aforesaid features of adjustment will be more clearly appreciated as the description progresses.

The advancing or leading extremity of the cam wire 102 extends within the support 104 at an angle of 72° with respect to the vertical, as clearly shown in Figure 7. Thus, as the cam mechanism 62 rotates in a clockwise direction, as viewed from the right of Figures 6, 7, and 8, and the dwell member 88 is about to release the star 64, the wire 102 enters a peripheral recess or opening 116 at an angle of 72° from the vertical. Depending upon the position of adjustment of the cam wire 102, engagement between the cam wire 102 and star tooth 100 is initiated so as to cause said star to rotate in a clockwise direction as indicated in Figure 7. At this instant the recess or space 98 is so positioned as to permit clearance for the star teeth 100. When the wire 102 has shifted from the entering position shown in Figure 7 to the leaving position shown in Figure 8, the star will have experienced one-tenth of a revolution, which is sufficient to pull through one complete frame or picture on the film. It will be seen that the wire 102 in Figure 8 leaves the star at an angle of 36° from the vertical and the dwell surfaces 94 are again brought into registration with the complementary peripheral opening 116 in the star. For a clear understanding of the constituent parts of the cam mechanism 62, attention is particularly directed to the exploded view in Figure 10.

It is important to note that the cross-over cam member or wire 102 is so disposed with respect to the star 64 as to impart a relatively fast intermittent movement to the star and at the same time gradually accelerate movement thereof at the start, and likewise gradually decelerate the movement of the star at the end of its movement. By this arrangement, wear and tear of the sprocket 50 upon the film is greatly reduced so as to materially increase the useful life of the film. The increase in the speed of intermittent movement of the film, resulting from the use of my improved cam and star mechanism, appreciably increases the efficiency of the light source which provides the screen illumination. By means of the star and cam mechanism just described, I am able to increase the usual four to one speed ratio of present day Geneva movement equipment to at least a ten to one speed ratio. Since the usual framing frequency is equal to twenty-four intermittent movements per second, a ten to one ratio of the cam to the star means that each movement of the film takes place in one-tenth of one twenty-fourth part of a second. Thus movement of the film is completed in one two hundred and fortieth part of a second, to-wit, one-tenth times one twenty-fourth equals one two hundred and fortieth. A 4 to 1 speed ratio requires ($\frac{1}{4} \times \frac{1}{24}$) or 1/96th part of a second to move the film past the shutter controlled aperture. This means that the shutter period is 1/96th part of a second as compared with a possible shutter period of 1/240th part of a second when my invention is employed.

In the case of a camera, decreasing the shutter period while maintaining the framing frequency constant permits longer exposures, and, in the case of a projector, decreasing the shutter period while maintaining the framing frequency constant permits longer projecting periods.

It will also be apparent from the foregoing description that, by having the leading end of the wire 102 enter the star at 72° and leave at 36° I am not limited as to the length of the wire to be used. The form and length of the wire, plus the depth to which the wire travels into the star recess or slot 116, determines the speed of the star. It will be observed that the intermediate portion of the wire 102 is reduced in diameter to render it operable in passing through the star slot 116 at an angle with respect to the star axis.

One of the most important novel features of the present invention resides in the provision of a star and cam mechanism which is adjustable for various speed ratios. As previously set forth, both extremities of the wire 102 are adjustable. The supports 104 and 106 are adjustable upon the rotary carrier 92 and each extremity of the wire is adjustably secured to its companion support by the set screws 112 and 114. Various speeds of the star may be obtained by simply adjusting the setting of the wire 102.

In Figures 11 to 14, inclusive, I have illustrated how various speed ratios may be obtained by adjusting the setting of the wire 102. Figure 11 shows the wire entering the star at an angle of 72°. By properly adjusting the wire to the position indicated in Figure 12, no movement is imparted to the star until a portion of the leading end of the wire has entered. As the point on the wire indicated by the letter A (Figure 12) reaches the star, movement of the star is initiated. When the cam has rotated through an angle of 40°, the star will have experienced one-tenth of a revolution. In other words, the speed ratio of cam to star is 9 to 1.

If the wire is adjusted to the position shown in Figure 13, movement of the star is initiated when the point B on the wire reaches the star. Thus movement of the star begins immediately upon the entrance of the wire within the star slot. With this setting, a 60° rotation of the cam is required to impart one-tenth of a revolution to the star. This setting causes a 6 to 1 speed ratio.

In Figure 14 the cam wire is set to cause a 10 to 1 speed ratio. The wire engages the star at C, and only a 36° rotation of the cam is required to impart a complete frame movement to the film 42.

From the foregoing it will be apparent that my improved star and cam mechanism may be adjusted to cause speed ratios ranging from 6–1 to 10–1, without varying the framing frequency or the frequency of the intermittent movement. This range of speed ratios is accomplished by a very simple adjustment or setting of the cross-over wire. The wire is adapted to be adjusted circumferentially, radially, and axially to vary the instant and the period of engagement between the cam and star, and to aline the wire element properly with the recess in the star.

Attention is directed to relieved surfaces 118 provided on the dwell member 88. The peripheral space or opening 98 is of sufficient circumferential width to provide the required clearance when the wire 102 is set for a 10 to 1 speed ratio, or, in other words, when the cam mechanism 62 only requires a 36° movement (see Figure 14) to impart movement to the star. For other settings or speed ratios the relieved surfaces 118 provide the necessary clearance for the star teeth 100.

In Figure 9 I have graphically illustrated how my improved star and cam mechanism provides increased film speed coupled with gradual acceleration and deceleration. On the graph in Figure 9 intermittent movement begins at "O" and gradually accelerates to "X", and then suddenly experiences a relatively rapid rise to "Y"; a relatively gradual change from "Y" to "Y'" and then a sudden decrease in speed to "Z", at which time a relatively gradual deceleration takes place until movement ceases. It is this gradual acceleration and deceleration coupled with the intermediate fast movement which reduces to a minimum the wear on the film caused by the teeth 52 of the sprocket 50 in pulling said film past the aperture gate. Conventional Geneva mechanisms and claw mechanisms with which I am familiar are not capable of affording the above-mentioned efficient operating characteristics. Obviously the speed curve will vary for different settings of the wire, and it should be understood that the graph in Figure 9 has not been plotted from actual readings, but is only shown for illustrative purposes to more clearly indicate the improved operating characteristics of the mechanism for imparting intermittent movement to a motion picture film.

In Figures 15 to 21, inclusive, I have illustrated a modified cam mechanism which is designated generally by the numeral 62a. This mechanism is very similar to the cam mechanism 62 previously described. One of the main differences of the cam mechanism 62a resides in the manner in which the cam wire 102a is mounted upon the rotary carrier 92a. The wire 102 is mounted in adjustable supports at both ends, whereas the wire 102a has an adjustable support 104a at only one end, namely, the leading end. This support 104a is adjustably secured to the carrier 92a by screws 108a (Figures 15 and 16). The opposite end of the wire 102a is mounted directly within the carrier 92a. Set screws 112a and 114a serve to enable the wire ends to be set at adjusted positions.

It will also be noted that the leading end of the wire 102a enters the star slot (Figure 18) at an angle of 36° from the center or vertical. When the wire 102a leaves the star, it is centered with the dwell member 88a (Figure 19). This is to be distinguished from the cam wire 102 which enters at 72° off center. By this arrangement I am able to use a longer wire and utilize the same wire for various speed ratios.

In Figures 22 to 28, inclusive, I have illustrated another embodiment of the invention, wherein a cam mechanism 62b includes a dwell member 88b, a rotary carrier 92b, and a cam wire 102b. The cam wire 102b is mounted directly within the members 88b and 92b without the use of auxiliary supports. Set screws 112b and 114b permit the wire 102b to be adjustably positioned within certain limits. Obviously the wires 102 and 102a may be adjusted to a considerably greater degree than the wire 102b.

The wire 102b enters the star slot (Figure 25) on center with respect to the dwell member, and leaves the star at 36° off center to the right of the dwell member. This is to be distinguished from the previously described structure. The wire 102b (Figure 28), as it enters and leaves the star slot, extends in parallelism with the dwell member 88b. This straight section on the wire guides the star onto the dwell member, after intermittent movement of one-tenth of a revolution has been imparted to the star, and insures registration of the star slot or recess with the periphery of the dwell member.

Referring again to Figures 1 and 2, it will be noted that the sprocket and star shaft 84 may be adjusted to take care of wear between the cam dwell and star teeth. This adjustment is accomplished by manipulating the four screws 120. The heads of these screws are adapted to be clamped against a plate section 122 and sufficient clearance is provided in the plate section 122 to permit the required adjustment for wear to be made. In connection with the sprocket 50, attention is again directed to the fact that four of the sprocket teeth 52 thereof are adapted to simultaneously register with complementary apertures in the film 42. In this manner the pull upon the film caused by the intermittent movement of the sprocket is always distributed over at least four sprocket teeth, thereby reducing the tendency for the sprocket teeth to damage the sprocket holes in the film. Actual tests show that the film life, when my device is employed, is from four to six times longer than when conventional claw mechanisms are used.

In the star mechanism 64 disclosed herein the peripheral spaces or openings 116 include an inner radial section substantially equal in width to the width of the cam wire and curved at the bottom in conformity with the peripheral contour of the cam wire. These radial sections of the openings 16 are bounded by parallel side walls, and it will be noted that the walls or surfaces 96 (Figures 6 to 8, inclusive) form continuations of these parallel side walls. These surfaces 96 are disposed at an angle which conforms with the angularity of the dwell surfaces 94. In the present embodiment surfaces 96 of the star companion to a given opening 116 are disposed at an angle of 72°, which conforms with the 72° included angle of the dwell surfaces 94. Obviously this degree of angularity may be varied to suit the particular needs incident to the use of the star and cam mechanism.

From the foregoing it will be understood that the outer or flared portions 96 of the star openings are provided for receiving the peripheral surface of the dwell member, whereas the inner, radially defined sections 116 of the openings are designed to cooperate with the cam wire in effecting intermittent movement.

It will be apparent from the foregoing that my invention contemplates an improved mechanism for imparting intermittent movement to motion picture film whereby increased speed of movement may be obtained, and at the same time the useful life of the film lengthened. The adjustable feature of the above described star and cam mechanism makes it possible to obtain a relatively wide range of speed ratios without the substitution of new parts. The cross-over wire is not only adjustable to produce various speeds, but is easily removable for purposes of repair or replacement. The speed ratio of the cam to the star obviously depends upon the length of the wire and the peripheral opening in the cam dwell or dwell member. A longer engagement of the wire with the star decreases the speed ratio and a shorter engagement increases the speed ratio. By having the wire positioned off center with respect to the cam dwell, I am able to use a single wire so as to have a shorter or longer portion thereof operatively engage the star. Thus, by this arrangement, I preclude the necessity of using a plurality of cam members or wires to obtain various speed ratios. My invention contemplates an intermittent movement mechanism for any type of motion picture apparatus wherein intermittent movement of film is required, and this mechanism includes a film moving means such as a sprocket, a driving means therefor such as a star, actuating means for imparting intermittent movement to the driving means or star in combination with means for adjusting the driving and actuating means so as to obtain various speed ratios. Obviously the invention is not limited to motion picture projectors, but, for the purpose of illustrating one practical application thereof, the invention has been described herein in combination with a motion picture projector.

The cam elements 102—102a—102b herein have been referred to as "wires". This term "wire" is used in its broadest sense to mean an elongated metallic element or bar capable of entering and leaving the peripheral openings in the star so as to impart intermittent movement thereto. While in the present embodiment I have disclosed a round wire, the invention obviously is not limited to a wire of round cross-section, but contemplates wires of different cross-sectional contours which will serve the purposes contemplated herein.

The invention is capable of other modifications and changes without departing from the spirit and scope of the appended claims.

Having thus described my invention, what I claim as new and desire to secure by Letters Patent is:

1. In apparatus for feeding motion picture film, a mechanism comprising a device adapted to be connected to drive a film engaging means, an instrumentality engaging said device to intermittently operate the same, said instrumentality having an adjustable element for adjustment to move said device through a predetermined distance and at a predetermined frequency for all adjustments while varying the speed of movement of said device.

2. In apparatus for feeding motion picture film, a mechanism comprising a rotary film driving means and a cam engaging said driving means and driven at a constant speed for imparting intermittent movement to said driving means, said cam having an adjustable element for adjustment to move said driving means through a predetermined distance and at a predetermined frequency for all adjustments while varying the speed of movement of said driving means.

3. In apparatus for feeding motion picture film, a star mechanism adapted to be connected to a film engaging means, a cam comprising relatively adjustable elements, one of which periodically engages the star mechanism to intermittently operate the same, and means whereby said elements may be relatively adjusted to vary the speed of movement of the star mechanism while causing said cam to move said star mechanism through a predetermined distance and at a predetermined frequency for all adjustments.

4. In apparatus for moving motion picture film, an intermittent movement mechanism comprising rotary film driving means including a peripherally recessed rotary member, and cam means for imparting intermittent movement to said peripherally recessed member, said means comprising a cam element periodically entering and leaving a peripheral recess in said rotary member, and means for adjusting the cam element relative to the peripherally recessed member to vary the angle at which said cam means initially enters a peripheral recess of said driving means.

5. In apparatus for feeding motion picture film, a mechanism comprising rotary film driving means and actuating means driven at a substantially constant speed for imparting intermittent movement to said rotary driving means, said actuating means comprising a rotary member and a cam member carried by said rotary member and engaging said rotary film driving means, and means whereby said cam member may be adjusted circumferentially relative to said rotary member to move said rotary film driving means through a predetermined distance and at a predetermined frequency for all adjustments while varying the speed of movement of the rotary film driving means.

6. In apparatus for feeding motion picture film, a mechanism comprising rotary film driving means and actuating means driven at a substantially constant speed for imparting intermittent movement to said rotary driving means, said actuating means comprising a rotary member and a cam member carried by said rotary member and engaging said driving means, and means whereby said cam member may be adjusted axially relative to said rotary member to move said rotary film driving means through a predetermined distance and at a predetermined frequency for all adjustments while varying the speed of movement of said rotary film driving means.

7. In apparatus for moving motion picture film, an intermittent movement mechanism comprising rotary film driving means, and actuating means driven at a substantially constant speed for imparting intermittent movement to said rotary driving means, said actuating means comprising a cam member radially adjustable to impart movement to said rotary driving means at different speeds while maintaining substantially constant the angular distance of rotation of the film driving means.

8. In apparatus for moving motion picture film, a mechanism comprising rotary film driving means, and actuating means driving at a substantially constant speed for imparting intermittent movement to said rotary driving means, said actuating means comprising a rotary member and a cam member carried by said rotary member and engaging said rotary film driving means, and means whereby said cam member may be adjusted circumferentially, axially and radially to move said film driving means a predetermined angular distance and at a predetermined frequency for all adjustments while varying the speed of movement of said film driving means.

9. In apparatus for moving motion picture film, an intermittent movement mechanism comprising rotary film driving means, and actuating means including a wire cam element for imparting intermittent movement to said rotary driving means.

10. In apparatus for moving motion picture film, an intermittent movement mechanism comprising rotary film driving means, actuating means comprising a wire cam element for imparting intermittent movement to said rotary driving means, and means for adjustably mounting said wire cam element with respect to said driving means.

11. In apparatus for moving motion picture film, an intermittent movement mechanism comprising rotary film driving means, actuating means comprising a wire cam element for imparting intermittent movement to said rotary driving means, and means for adjustably mounting at least one extremity of said wire element.

12. In apparatus for moving motion picture film, an intermittent movement mechanism comprising rotary film driving means, actuating means comprising a wire cam element for imparting intermittent movement to said rotary driving means, and means for adjustably mounting each extremity of said wire element.

13. In apparatus for feeding motion picture film, a star mechanism adapted to be connected to a film engaging means, said star mechanism including a member having a plurality of peripheral recesses, each recess including an inner portion of reduced width and an outer portion of increasing width communicating therewith and determined by oppositely inclined plane surfaces, and a cam for imparting intermittent movement to said star mechanism, said cam having an element intermittently and successively engaging in the recess of said star mechanism, and means whereby said element may be adjusted to move said star mechanism through a predetermined distance and at a predetermined frequency for all adjustments while varying the speed of movement of said mechanism.

14. In apparatus for feeding motion picture film, a mechanism comprising rotary film driving means including a rotary body having a plurality of peripheral recesses, dwell means adapted to register successively with said recesses, said dwell means registering with each recess during a predetermined interval to prevent rotation of said driving means and releasing said driving means during a following interval, and cam means having an element adapted to enter a peripheral recess of said rotary body at a point circumferentially spaced from the recess registering with said dwell means to impart intermittent movement to said rotary driving means when said driving means is released from said dwell means, and means whereby said element may be adjusted to move the film driving means through a predetermined distance and at a predetermined frequency for all adjustments while varying the speed of movement of said film driving means.

15. In apparatus for moving motion picture film, an intermittent movement mechanism comprising rotary film driving means comprising a rotary body having a plurality of peripheral recesses, dwell means adapted to register with one of said recesses during a predetermined interval to prevent rotation of said driving means and to release said driving means during a following interval, and cam means comprising a cam wire element adapted to enter a peripheral recess of said driving means at a point circumferentially spaced from the recess registering with said dwell means to impart intermittent movement to said rotary driving means when said driving means is released from said dwell means.

16. In apparatus for moving motion picture film, an intermittent movement mechanism comprising rotary film driving means comprising a rotary body having a plurality of peripheral recesses, dwell means adapted to register with one of said recesses during a predetermined interval to prevent rotation of said driving means and to release said driving means during a following interval, and cam means comprising a cam wire element adapted to enter the peripheral recess registering with said dwell means to impart intermittent movement to said rotary driving means when said driving means is released from said dwell means.

17. In apparatus for moving motion picture film, an intermittent movement mechanism comprising rotary film driving means comprising a rotary body having a plurality of peripheral recesses, dwell means adapted to register with one of said recesses during a predetermined interval to prevent rotation of said driving means and to release said driving means during a following interval, and cam means comprising a cam wire element adapted to enter a peripheral recess of said driving means at a point circumferentially spaced from the recess registering with said dwell means to impart intermittent movement to said rotary driving means when said driving means is released from said dwell means, said wire being further adapted to leave the recess in said rotary driving means at a point on the periphery of said rotary driving means circumferentially spaced from the path of movement of said dwell means.

18. In apparatus for moving motion picture film, an intermittent movement mechanism comprising rotary film driving means comprising a rotary body having a plurality of peripheral recesses, dwell means adapted to register with one of said recesses during a predetermined interval to prevent rotation of said driving means and to release said driving means during a following interval, and cam means comprising a cam wire element adapted to enter the peripheral recess registering with said dwell means to impart intermittent movement to said rotary driving means when said driving means is released from said dwell means, said wire being further adapted to leave the peripheral recess in said rotary driving means at a point circumferentially spaced from the path of movement of said dwell means.

19. In apparatus for moving motion picture film, an intermittent movement mechanism comprising rotary film driving means, said driving means comprising a rotary body having a plurality of peripheral recesses, dwell means adapted to register with one of said recesses during a predetermined interval to prevent rotation of said driving means and to release said driving means during a succeeding interval, and cam means comprising a wire cam element adapted to enter a peripheral recess of the driving means when said driving means is released from said dwell means.

20. In apparatus for moving motion picture film, an intermittent movement mechanism comprising rotary film driving means, actuating means for imparting intermittent movement to said driving means, and means for operating said actuating means at a substantially constant speed, said actuating means comprising a cam element having a dwell portion and an active portion and means for varying the effective length of said active portion to vary the speed of operation of said rotary film driving means while maintaining the distance of movement of the film driving means substantially constant.

21. In apparatus for moving motion picture film, an intermittent movement mechanism comprising a rotary film driving member, and actuating means for imparting intermittent movement to said driving member, said actuating means comprising a cam wire element having a movement initiating portion for gradually accelerating the film driving member, and a following portion for rapidly accelerating the movement of the film driving member.

22. In apparatus for moving motion picture film, an intermittent movement mechanism comprising a rotary film driving member, and actuating means for imparting intermittent movement to said driving member, said actuating means comprising a cam wire element having a movement initiating portion for gradually accelerating the film driving member, a movement concluding portion for gradually decelerating the movement of the film driving member, and an intermediate portion for rapidly accelerating and decelerating the movement of the film driving member.

23. In apparatus for moving motion picture film, an intermittent movement mechanism comprising a shiftable film driving member, and actuating means for imparting intermittent movement to said driving member, said actuating means comprising a rotary member and a cam element carried by said rotary member, said cam element having a movement initiating portion extending circumferentially of said rotary member for gradually accelerating the film driving member, and a following portion extending circumferentially of said rotary member for rapidly accelerating the movement of the film driving member, and said cam element being adjustably mounted with respect to the rotary member to vary the rate of rapid acceleration of the film driving member by said cam element while maintaining substantially constant for all adjustments the angular distance of rotation and frequency of movement of the film driving means.

24. In apparatus for moving motion picture film, an intermittent movement mechanism comprising a shiftable film driving member, and actuating means for imparting intermittent movement to said driving member, said actuating means comprising a rotary member and a cam element carried by said rotary member, said cam element having a movement initiating portion extending circumferentially of said rotary member for gradually accelerating the film driving member, a movement concluding portion extending circumferentially of said rotary member for gradually decelerating the movement of the film driving member, and an intermediate portion also extending circumferentially of said rotary member for rapidly accelerating and decelerating the movement of the film driving member, and said cam element being adjustably mounted with respect to the driving member to vary the rate of rapid acceleration and deceleration of the film driving member by said cam element while maintaining substantially constant for all adjustments the angular distance of rotation and frequency of movement of the film driving means.

25. An intermittent grip mechanism comprising engaged driving and driven elements and means whereby said driving element may be adjusted to drive said driven element through a predetermined distance and at a predetermined frequency for all adjustments while varying the speed at which said driven element is moved by said driving element.

OSCAR J. HOLMES.